(12) United States Patent
Browning (10) Patent No.: US 11,068,756 B2
(45) Date of Patent: Jul. 20, 2021

(54) HETEROGENEOUS DATA FUSION

(71) Applicant: Government of the United States, as represented by the Secretary of the Air Force, Wright-Patterson AFB, OH (US)

(72) Inventor: James Browning, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 24 days.

(21) Appl. No.: 16/299,517

(22) Filed: Mar. 12, 2019

(65) Prior Publication Data

US 2020/0293837 A1    Sep. 17, 2020

(51) Int. Cl.
  *G06K 9/00* (2006.01)
  *G06K 9/62* (2006.01)
  *G06F 17/14* (2006.01)
  *G06T 17/05* (2011.01)

(52) U.S. Cl.
  CPC ............ *G06K 9/6293* (2013.01); *G06F 17/14* (2013.01); *G06T 17/05* (2013.01)

(58) Field of Classification Search
  CPC ....... G06K 9/6293; G06F 17/14; G06T 17/05; G01S 17/87; G01S 13/87; G01S 7/003; G01S 13/723; G01S 13/003; G01S 13/86
  See application file for complete search history.

(56) References Cited

U.S. PATENT DOCUMENTS

| | | | |
|---|---|---|---|
| 10,444,366 B1* | 10/2019 | Stochino | G01S 17/08 |
| 2003/0154060 A1 | 8/2003 | Damron | |
| 2007/0076917 A1 | 4/2007 | Chen et al. | |
| 2008/0036593 A1* | 2/2008 | Rose-Pehrsson | G08B 25/00 340/540 |
| 2008/0288425 A1 | 11/2008 | Posse et al. | |
| 2009/0240481 A1 | 9/2009 | Durrant-Whyte et al. | |
| 2009/0287991 A1 | 11/2009 | Nakamura et al. | |
| 2014/0029849 A1* | 1/2014 | Sen | G06T 5/00 382/167 |
| 2015/0381965 A1* | 12/2015 | Atanassov | G06T 3/4061 348/47 |
| 2017/0195654 A1* | 7/2017 | Powers | H04N 5/332 |
| 2019/0213778 A1* | 7/2019 | Du | G06T 15/04 |

OTHER PUBLICATIONS

Browning, James Paul, et al., "Depth-Based Method for Target Detection in Noisy Environments", IEEE RadarCon 2013, May 2013.

* cited by examiner

*Primary Examiner* — Dhaval V Patel
(74) *Attorney, Agent, or Firm* — AFMCLO/JAZ; Jeffrey V. Bamber (57) ABSTRACT

Various deficiencies in the prior art are addressed by systems, methods, architectures, mechanisms and/or apparatus configured to fuse data received from a plurality of sensor sources on a network. The fusing data includes forming an empirical distribution for each of the sensor sources, reformatting the data from each of the sensor sources into pre-rotational alpha-trimmed depth regions, applying an affine transformation rotation to each of the reformatted data to form post-rotational pre-rotational alpha-trimmed depth regions, and reformatting each affine transformation into a new data fusion operator.

25 Claims, 10 Drawing Sheets

| | Heterogeneous Sensor Heterogeneous Data Fusion Algorithms |
|---|---|
| Step 1 | Determine number of sensors, $m$, to be integrated |
| Step 2 | Solve for the affine transformation angle $$\varphi = \frac{\pi}{m}$$ |
| Step 3 | Reformat sensor data, for each sensor type into the following pre-rotational $\alpha$-trimmed depth regions $$D_i^\alpha(P) \in [D_i^\alpha(P_X), D_i^\alpha(P_Y), 0,] \forall i \in [1, \ldots, m]$$ |
| Step 4 | Apply the appropriate affine transformation rotation to form the following post-rotational pre-rotational $\alpha$-trimmed depth regions $$D'^\alpha_i(P) = D_i^\alpha(P) \times R_Z(\varphi) \forall i \in [1, \ldots, m]$$ |
| Step 5 | Reformat each affine transformation into the new data fusion operator, $$D^\alpha(P) = [D'^\alpha_1(P); \ldots; D'^\alpha_m(P)]$$ |
| Step 6 | Store and/or disseminate and/or post-process the new data fusion operator $D^\alpha(P)$ as required |

| $Vol_{p^{th}}$ Annulus | $\bar{\mu}$ | $\bar{\sigma}$ | $V_{empirical}$ |
|---|---|---|---|
| 90% | 0.0016 | $3.2e^{-4}$ | $\bar{\mu} + \kappa\bar{\sigma}$ |
| 75% | 0.0011 | $3.2e^{-4}$ | $\bar{\mu} + \kappa\bar{\sigma}$ |
| 50% | $4.3e^{-4}$ | $2.3e^{-4}$ | $\bar{\mu} + \kappa\bar{\sigma}$ |

FIG. 7

| Minimum Population from the Mean | Number of Standard Deviations (k) |
|---|---|
| 50% | $\sqrt{2}$ |
| 75% | 2 |
| 89% | 3 |
| 94% | 4 |
| 96% | 5 |
| 97% | 6 |
| $1 - \frac{1}{\kappa^2}$ % | k |

FIG. 8

FIG. 9 ents described herein may be manufactured, used and/or licensed by or for the United States Government without the payment of royalties thereon.

HETEROGENEOUS DATA FUSION

GOVERNMENT INTEREST

The embodiments described herein may be manufactured, used and/or licensed by or for the United States Government without the payment of royalties thereon.

FIELD OF THE DISCLOSURE

The embodiments herein generally relate to data fusion, and more particularly, to a nonparametric method for fusing similar or dissimilar data from similar or dissimilar sources where the data fusion occurs in a higher dimensionality than the input data based upon an affine invariant transformation process, resulting in a computational data processing efficiency through the affine invariant transformation of lower-dimensional heterogeneous data sources into a single higher-dimensional fused data operator.

BACKGROUND

A mathematical foundation for pre-detection fusion of heterogeneous sensors is needed in order to field a system of distributed and layered sensors that can detect and perform parameter estimation of complex, extended targets in difficult interference environments without the aid of humans, in real-time with minimal latency. Numerous studies have fused homogeneous and heterogeneous sensors using post-detection and target tracking data. Current state of the art uses federated post-detection/tracking data fusion. This required each sensor to supply post-processing data to a fusion algorithm that would attempt to make use of the various data products, and post-processing results from the sensor(s) would be displayed and/or tabulated for subsequent use. The current state of the art also does not seek to fuse data products pre-detection and/or pre-processed.

The fusion of independent sensors processing chains after detection will not lend itself to emulating sensor fusion comparable to that of a human; or so-called sensor autonomy. Humans have five heterogeneous sensors (or sensor sets) that together declare the existence and estimate the parameters (intent) of complex targets in real-world background utilizing acoustic (pressure), visible light (EM Spectrum), smell (chemical compound detection), taste (chemical compound detection), and touch (tactile pressure sensor).

Germane to the realization of distributed and layered sensing vision and the desire to anticipate, find, fix, track, engage, and assess, anything, anytime, anywhere (AF2T2EA4) is the development of a mathematical method that will result in the ability to fuse disparate sensor assets into a robust system that can detect, discriminate, declare, and identify targets on the ground, in the air, or in space, all autonomously.

SUMMARY OF THE INVENTION

Various deficiencies in the prior art are addressed by systems, methods, architectures, mechanisms and/or apparatus configured to fuse data received from a plurality of sensor sources on a network. The fusing data includes forming an empirical distribution for each of the sensor sources, reformatting the data from each of the sensor sources into pre-rotational alpha-trimmed depth regions, applying an affine transformation rotation to each of the reformatted data to form post-rotational pre-rotational alpha-trimmed depth regions, and reformatting each affine transformation into a new data fusion operator.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Generally speaking, the various embodiments disclosed herein introduce a nonparametric method for data fusion, wherein the data to be fused is from a number of sensors of similar and/or dissimilar types producing data that is of a similar/dissimilar type. Further, data fusion occurs in a higher dimensionality than the input sensor data, producing a data fusion output that is three-dimensional. The nonparametric output of the data fusion process is suitable for storage, dissemination, and/or post-processing via any number of established mathematical algorithms.

The various embodiment disclosed herein may be applied to layered sensing and cognitive radar/sensor initiatives. Twenty-first century asymmetric threats introduce stressing sensing conditions that exceed the ability of conventional sensing systems and data processing algorithms to perform their required intelligence, surveillance, and reconnaissance missions in tactically-relevant timeframes. For instance, such threats place real-time constraints of seconds, not hours, to detect and declare targets whether they are in space, air, or on the ground. In particular, there is a growing need and desire to move beyond single sensing systems, and instead begin fielding and leveraging distributed sensing systems to overcome the inherent challenges imposed by the modern threat space. Thus, embodiment of the computational data processing efficiency disclosed herein, through the use of an affine invariant transformation process that fuses lower-dimensional sensor data from distributed and layered sensors, into a higher-dimensional fused data operator, is suitable for user-specific data processing and exploitation algorithms, enabling real time exploitation of the layered sensing and cognitive radar/sensor initiatives.

Sensor Networks

One major challenge for distributed sensing networks is the issue of data fusion. Put simply, determining how to take all of the data generated by a network of sensors and assembling the data deluge into a meaningful quantity that is able to be processed. One method would be to have each sensor transmit, receive, and process data from the sensor network. Essentially, each sensor is an active agent in the network, but processes data independently of its neighbors. An advantage to this system would be the redundancy built into the network, and the ability to parallelize tasks, and process the data more quickly. One disadvantage, would be the extreme cost of outfitting each sensor with its own transmitter, receiver, and processor.

Another sensor fusion concept could be that of a netted radar. In this system design, several radars are linked together to improve the coverage or accuracy of the radar net. This improvement comes from the union of individual coverage area. The architecture of the radar net could be simplified by using range-only data, which would result in a multilateration radar system.

A bistatic radar system for a distributed network of sensors includes two sensors, a transmitter and a receiver, where the transmitter and receiver are separated by a considerable distance in order to achieve some benefit: technical, operational, or cost. Further, a number of bistatic systems with multiple transmitters and receivers included in the sensor network creates a multistatic radar network.

According to a preferred embodiment, each sensor has a transmitter and receiver, or a transceiver. Additionally, the sensors are relatively simple, and only transmit and receive a single tone (which can change from pulse-to-pulse, or cpi-to-cpi if required). However, the sensors can be more complex and transmit/receive multiple tones if desired. Each sensor collects the received signal from each transmitter and sends this data to a fusion center or super-sensor. This super-sensor takes the accumulated big data and formats and/or stores the data for real-time or near real-time processing. The super-sensor has only a communications system that is capable of transmitting and receiving information from each sensor in the network, but does not participate in the sensing activities of the network. In this manner, the sensor network is actually a layered system of systems, comprising a separate processing platform from the relatively simple and low-cost sensing systems.

Figure 1A:
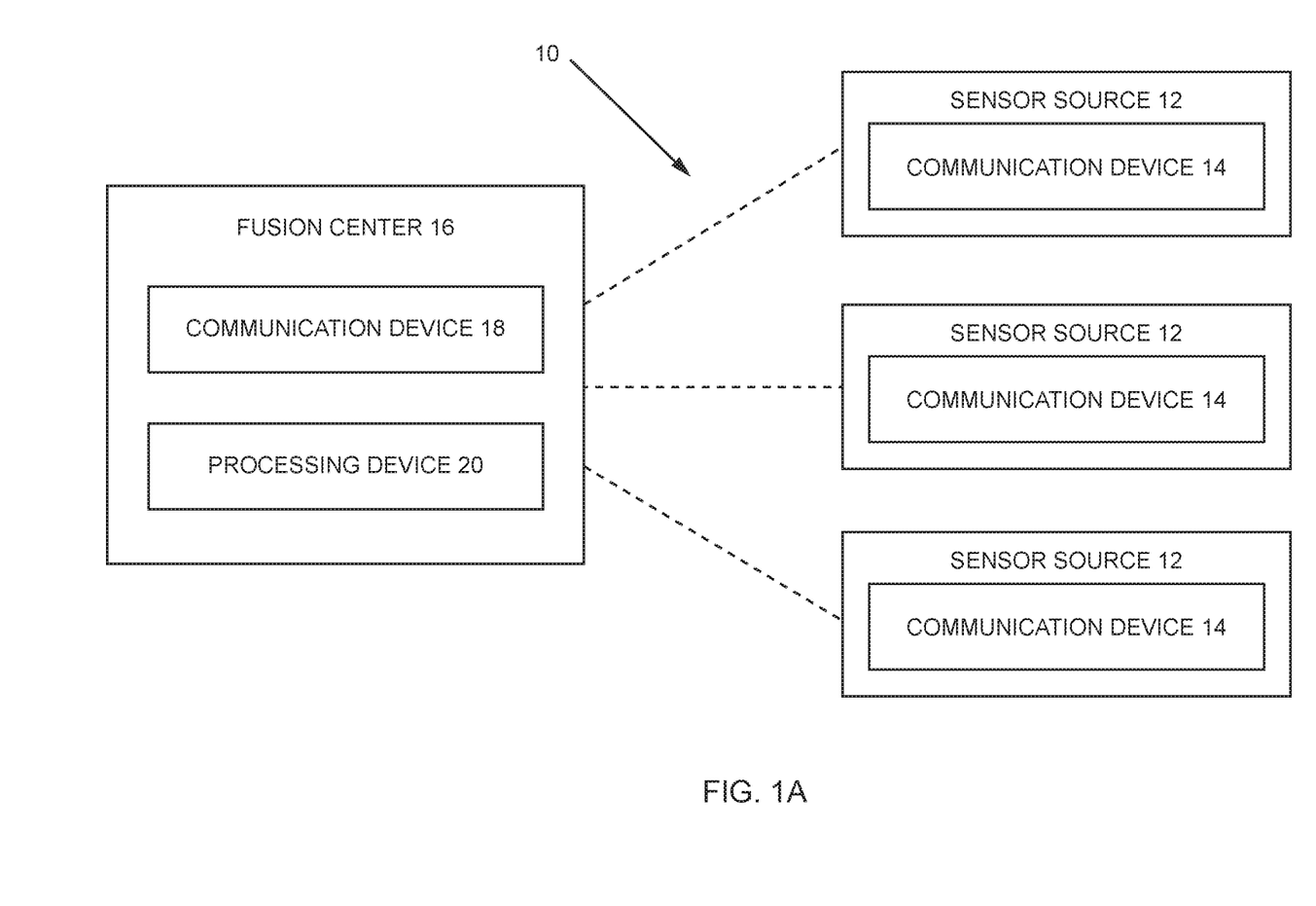
FIG. 1a depicts a generalized sensor network according to an embodiment of the present invention.

FIG. 1a illustrates a generalized example of a sensor network 10. The sensor network 10 includes a plurality of sensor sources 12, each sensor source including a communication device 14 for transmitting or receiving data. The communication device 14 could be a transmitter and receiver, or a transceiver. It is to be noted that the plurality of sensor sources 12 could be any number, and three are shown in the figure for illustrative purposes only. The plurality of sensor sources 12 communicate with a fusion center 16 or super-sensor that also includes a communication device 18 capable of transmitting or receiving data. The fusion center 16 further includes a processing device 20 configured to perform the functions required to fuse received data, to be described in detail below. The fusion center 16 may be implemented in a variety of configurations including general computing devices such as but not limited to desktop computers, laptop computers, tablets, network appliances, and the like. The fusion center 16 may also be implemented as a mobile device such as but not limited to a mobile phone, smart phone, smart watch, or tablet computer.

Figure 1B:
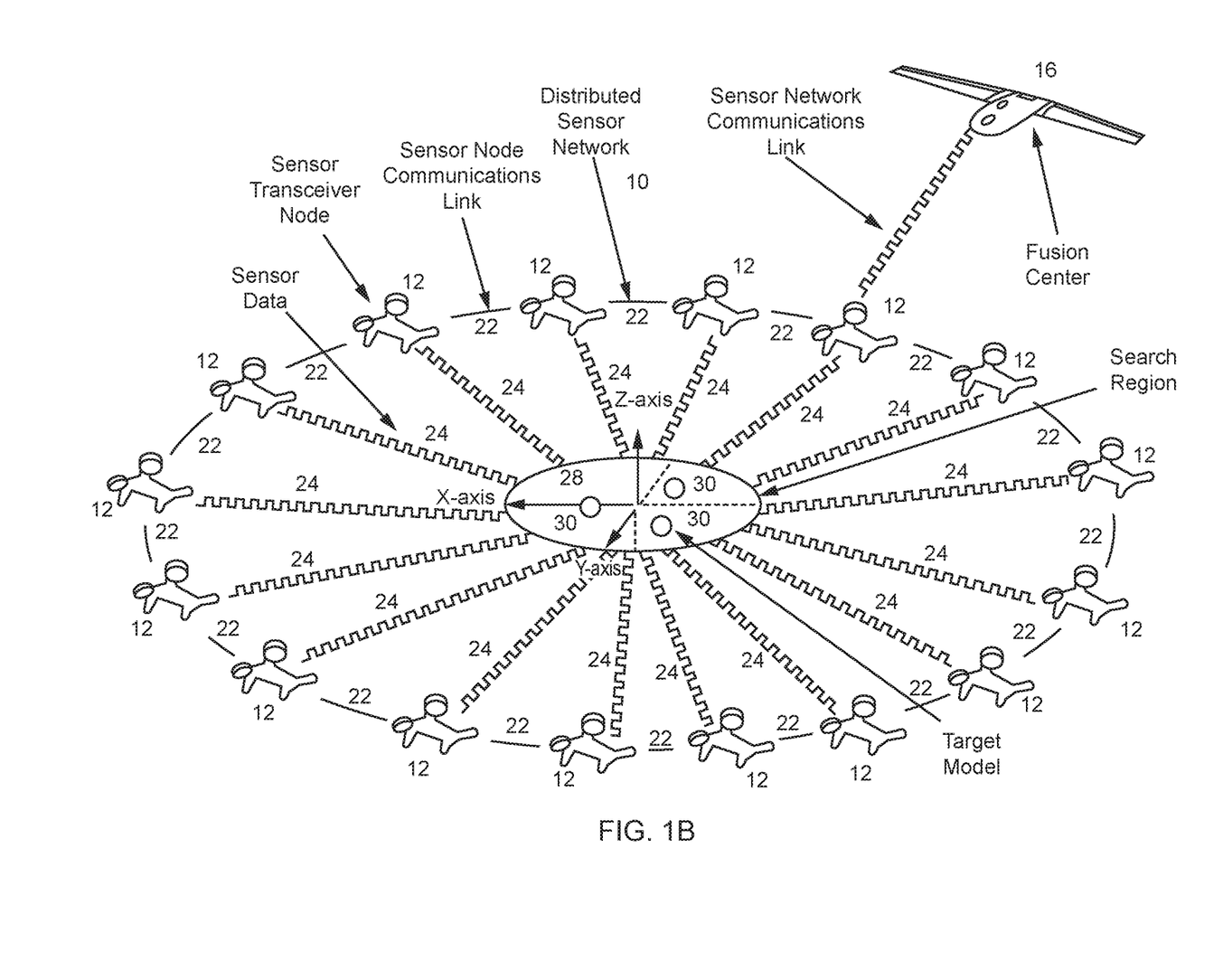
FIG. 1b depicts a generalized physical embodiment of a fusion process for a distributed sensing network according to an embodiment of the present invention.

FIG. 1b illustrates a generalized physical embodiment of a fusion process for a distributed sensor network 10. The sensor network 10 includes a plurality of sensor nodes 12, each including a transceiver. The plurality of sensor nodes 12 are in communication via a communications link 22. The communications link 22 depends on the protocol used, but some examples include but are not limited to radio frequency, optical, and/or quantum entanglement. Examples of a radio frequency link include but are not limited to commercial 2G/3G/4G/LTE/5G cellular or 802.11a/b/g/n Wi-Fi, or military communication standards such as Link-11/16/22. Examples of an optical link include but are not limited to free-space laser or infrared. Emergent communication links based upon quantum entanglement are also applicable. The plurality of sensors nodes 12 are configured to send and/or receive sensor data 24. The plurality of sensor nodes 12 are also in communication with a fusion center 16 via a sensor network communications link 26. The search region 28 is the embodiment of any real-world planar or volumetric region that is under observation by the distributed sensor network 10. FIG. 1b depicts a simplified planar search region in three-dimensional space that contains three target models 30, representing an embodiment of real-world targets that may be observed by the sensor network 10. Target models 30 represent the embodiment of a generic target body that may be comprised of a single target scatterer, range-spread target, or Doppler-spread target. The target models 30 are considered to be standard point-scatterers targets with a defined radar-cross section, that may be non-fluctuating or fluctuating in value. Non-fluctuating radar cross sections are defined by a single numerical value, whilst fluctuating radar cross sections are commonly defined by a statistical distribution or model, such as the Swerling model.

Figure 1C:
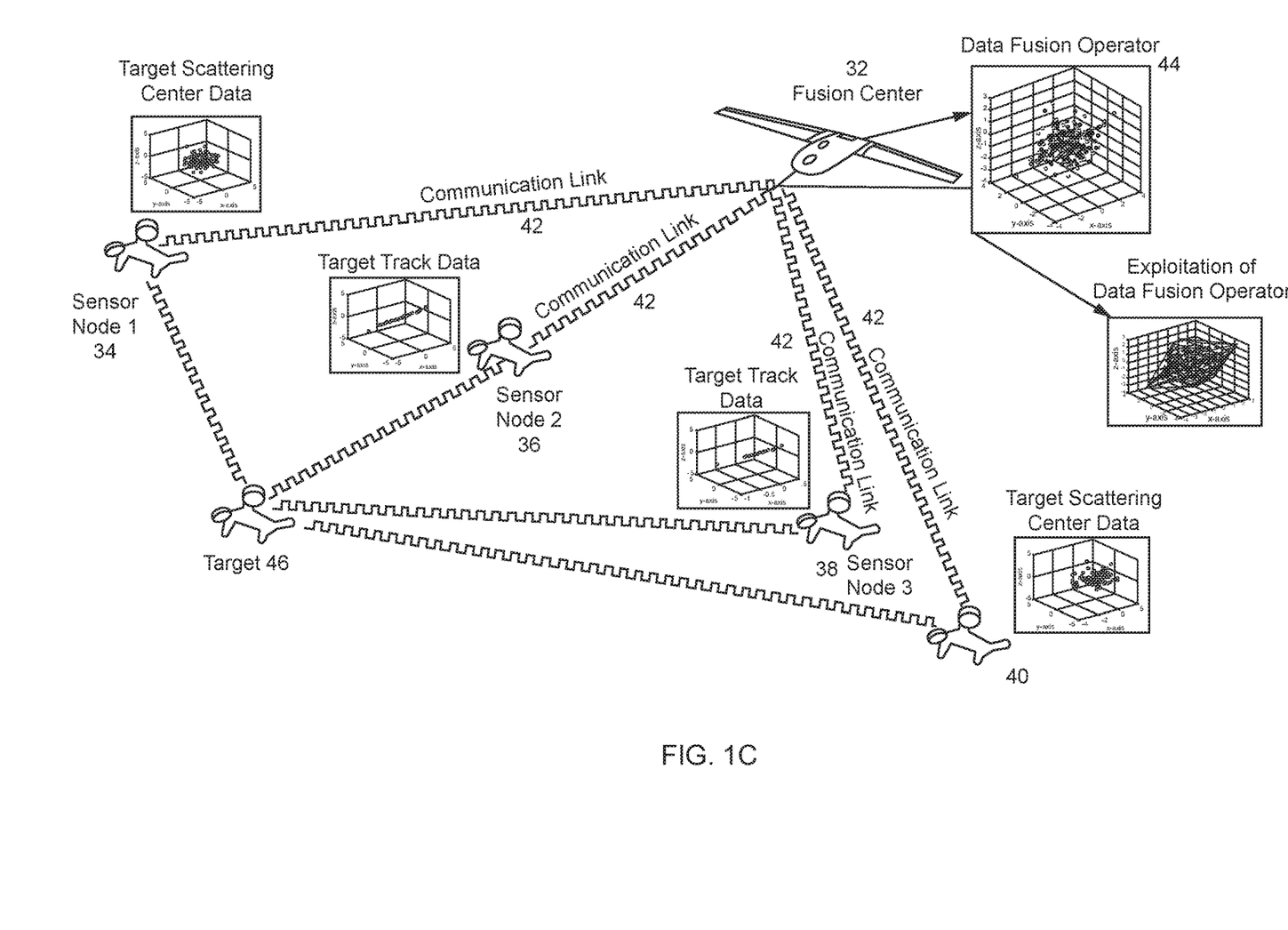
FIG. 1c depicts an application of the heterogeneous sensor data fusion for target exploitation according to an embodiment of the present invention.

FIG. 1c illustrates an application of the heterogeneous sensor data fusion in order to aid in tracking a target. A fusion center 32 receives target scattering center data from a first sensor node 34, target tracking data from a second sensor node 36, additional target tracking data from a third sensor node 38, and additional target scattering data from a fourth sensor node 40 via communication links 42. The fusion center 32 exploits a data fusion operator 44 in order to aid in tracking a target 46.

Response Matrix Formulation

Having defined a preferred embodiment of the sensor network, the pre-detection fusion process that will result in a multistatic response matrix, which is processed by the super-sensor 16, will be described. To simplify (but not limit) the description, the operations of the sensor network are constrained to that of two-dimensions. The sensor network includes a total of m transmitters and n receivers, located at positions $y_n = (n=1, 2, \ldots, N)$ and $z_m = (m=1, 2, \ldots, M)$, respectively.

Each of the transmitters sends out a wave, which impinges upon an object; this object, in turn re-radiates a portion of the incident wave energy isotropically. The field received by the $n^{th}$ receiving element $y_n$ when the wave is emitted from the $m^{th}$ transmitter element $z_m$ is $\hat{u}(y_n, z_m)$. Removing the incident field obtains the $(n, m)^{th}$ entry of the corresponding multistatic response matrix:

$$A_{nm} = \hat{u}(y_n, z_m) - \hat{G}(\omega, y_n, z_m) \qquad (1)$$

The incident field is the homogeneous Green's function, which for two-dimensions is of the form $$\hat{G}(\omega, x, y) = \frac{i}{4} H_0^{(1)}\left(\frac{\omega}{c_0}|y - x|\right) \qquad (2)$$

with $H_0^{(1)}$ representing a Hankel function of the first-kind, zeroth order, and the vector x is the location of the object to be detected.

In the Born approximation, the volume for $\Omega_j$, $j=1, \ldots, r$ goes to zero, and the measured field is approximated by the expression:

$$\hat{u}(y_n, z_m) = \hat{G}(\omega, y_n, z_m) + \Sigma_{j=1}^r \rho_j \hat{G}(\omega, y_n, x_j) \hat{G}(\omega, x_j, z_m) \qquad (3)$$

for all transmitter and receiver locations n and m. The coefficient $\rho_j$ is the reflection coefficient and is defined by the quantity:

$$\rho_j = \frac{\omega^2}{c_0^2} \eta_j l_j^2 \qquad (4)$$

The singular value is determined from the expression:

$$\sigma_j \approx \rho_j \left(\sum_{n=1}^N |\hat{G}(\omega, x_j, y_n)|^2\right)^{\frac{1}{2}} \left(\sum_{m=1}^M |\hat{G}(\omega, x_j, z_m)|^2\right)^{\frac{1}{2}} \qquad (5)$$

where $\hat{G}(\omega, x_j, y_n)$ is the general form of the receiver array Green's functions and $\hat{G}(\omega, x_j, z_m)$ is the general form of the transmitter array Green's functions. To formulate the multistatic response matrix, it is also necessary to calculate the normalized vector of Green's functions for the transmitter and receiver array. The normalized vector of Green's functions for the receiver array to the reflector point specified by x is given by:

$$u(x) \approx \frac{1}{\left(\sum_{l=1}^N |\hat{G}(\omega, x, y_l)|^2\right)^{\frac{1}{2}}} \left(\hat{G}(\omega, x, y_n)\right)_{n=1,\ldots,N} \qquad (6)$$

The normalized vector of Green's functions for the transmitter array from the reflector point specified by x is given by:

$$v(x) \approx \frac{1}{\left(\sum_{l=1}^M |\hat{G}(\omega, x, z_l)|^2\right)^{\frac{1}{2}}} \left(\hat{G}(\omega, x, z_m)\right)_{m=1,\ldots,M} \qquad (7)$$

Having solved for the target singular value and the normalized vector of Green's functions for the transmitter and receiver array, the response matrix is determined from the following:

$$A = \Sigma_{j=1}^r \sigma_j u(x_j) v(x_j)^* \qquad (8)$$

Note that the response matrix is of bounded rank, r, and positive semidefinite.

It is assumed that the measurements will contain additive noise, represented by an N×M matrix, W, which is considered a matrix of independent and identically distributed complex entries with arbitrary statistics. This noise is an additive mixture of environmental and receiver system noise. The resultant measured response matrix is then:

$$B = A + \frac{1}{\sqrt{M}} W \qquad (9)$$

which is valid for the non-trivial asymptotic regimes in the limit M→∞ so the scaling factor $$\frac{1}{\sqrt{M}}$$

is appropriate.

Introduction to Half-Space Depth and Associated Properties

Given k multivariate populations $\pi_i = \pi(P_i)$ on $\mathbb{R}^d$, d>1, with absolutely continuous distributions $P_i$, defined on random variables $X_i$ for i ≥ 1, . . . , k, proposed herein is a procedure for selecting the "most dispersed" member from a group k populations. Measure of dispersion is defined in terms of the depth-based scale curve. The scale curves if $\mathcal{P}$ is the collection of probability distributions, a depth function may be considered to be any bounded, nonnegative mapping $D(\cdot; \cdot): \mathbb{R}^d \times \mathcal{P} \to \mathbb{R}$ that provides a probability-based center-outward ordering of points in $\mathbb{R}^d$. For the center-outward ranking, Tukey's Half-Space Depth is used:

$$D(x; P)=\inf\{P(H)|x\in H, H \text{ is a closed half-space}\} \quad (10)$$

where $x\in\mathbb{R}$. This half-space depth has four primary properties that provide insight into the power and utility of depth-based measures:

(1) $D(Ax+b; P_{Ax+b})=D(x; P_X)$ for any random vector $X\in\mathbb{R}^d$, and $d\times x$ nonsingular matrix A, and any $d\times 1$ vector b.

(2) For any $P\in\mathcal{P}$ with center $\Theta$, then $D(\Theta; P) =\sup_x D(x; P)$.

(3) If $\Theta$ is the deepest point for any $P\in\mathcal{P}$, then $D(x; P)\leq D(\Theta+\alpha(x-\Theta); P)$ for $\alpha\in[0,1]$.

(4) $D(x; P)\rightarrow 0$ as $\|x\|\rightarrow\infty$ for any $P\in\mathcal{P}$.

Depth-Regions and Measures and Dispersion

Application of the first property above allows for the definition of $\alpha$-trimmed depth-regions of P, $$D^\alpha(P)=\{x\in\mathbb{R}^d|D(x; P)\geq\alpha\} \quad (11)$$

Solving for the volume of a particular $\alpha$-trimmed depth-region de facto solves for the dispersion of that same region. In order to compare the dispersion of one population with that of a second population, the concept of a scale curve is introduced. The scale curve is the volume, or dispersion, and is defined as:

$$V^p=\inf\{\text{Volume}(D^\alpha(P))|P(D^\alpha(P))\geq p, 0<\alpha<\alpha^*\} \quad (12)$$

with $p\in(0,1)$ and where $\alpha^* = \sup_{x\in\mathbb{R}^d} D(x; P)$.

For $p\in(0,1)$, $\pi_i$ is more dispersed, or more concentrated, than $\pi_j$ (at level p), if $V_i^p \geq V_j^p$ is the volume from population $\pi_i$.

If P is absolutely continuous, the collections of $D^\alpha(P)$ based on the half-space depth are affine equivariant, nest, connected, and compact for $p\in(0,1)$.

Empirical Distribution

For any given set of data, let $X_{i,1}, X_{i,2}, \ldots, X_{i,n}$ be a random sample from $P_i$ for a random variable $X_i$, and B be a Borel set, the empirical distribution is defined as:

$$P_{i,n}(B) = \frac{1}{n}\sum_{j=1}^{n} I_B(X_{i,j}) \quad (13)$$

With $I_B(x)$ being an indicator function for B.

Depth-Based Data Fusion

Figure 2:
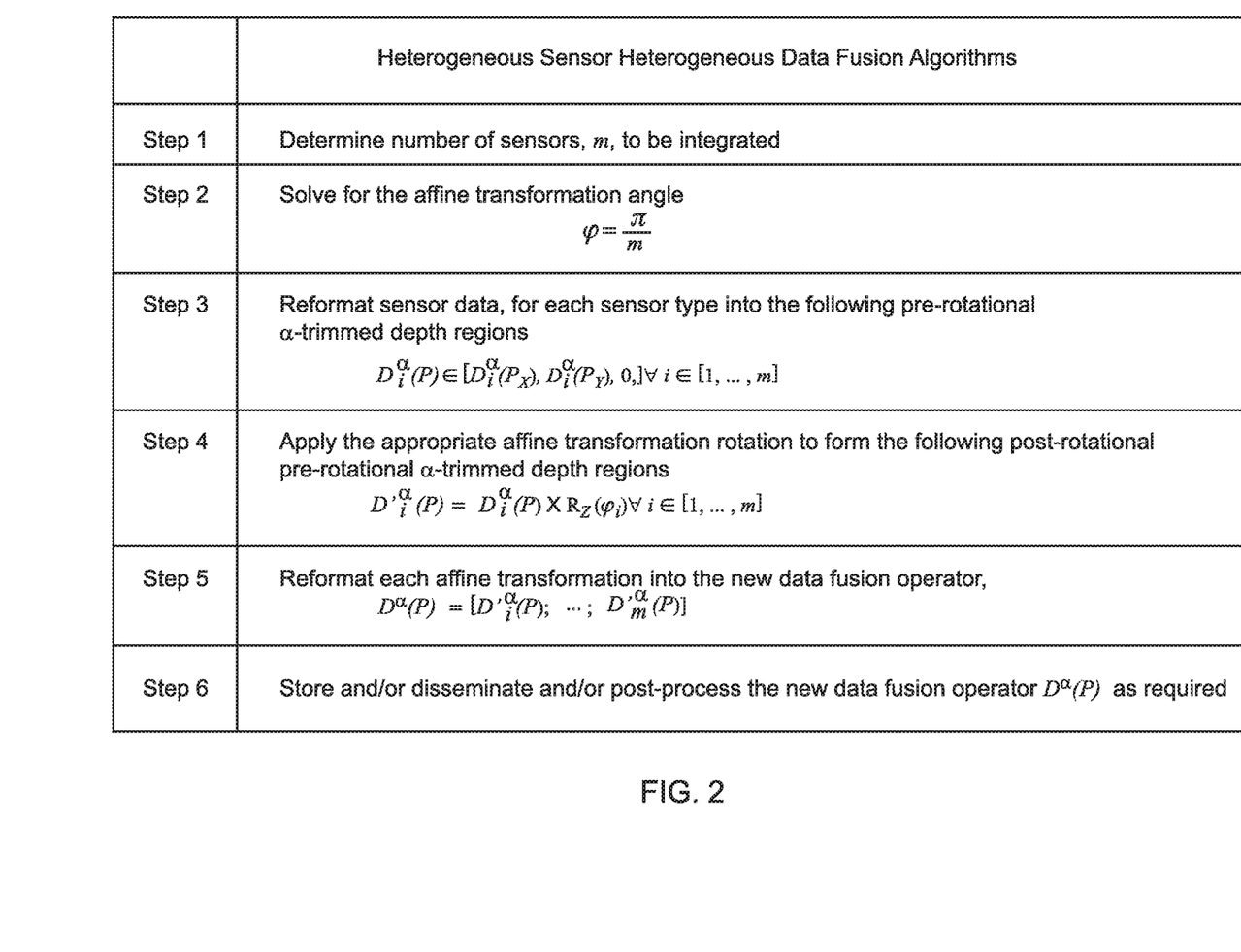
FIG. 2 depicts a flow chart for the data fusion method according to an embodiment of the present invention.

As stated previously, in statistics, depth-based approaches are used to compare the relative dispersion of one statistical population group with a second statistical population group. This would be an example of a post-data fusion processing approach. The ability of the data fusion method to fuse multiple input data sources into a new higher-dimensional statistical population that is suitable for traditional depth-based dispersion analysis, as well as a wide-variety of post-processing methodologies, is demonstrated. A flow chart for the data fusion method is shown in FIG. 2.

Figure 3:
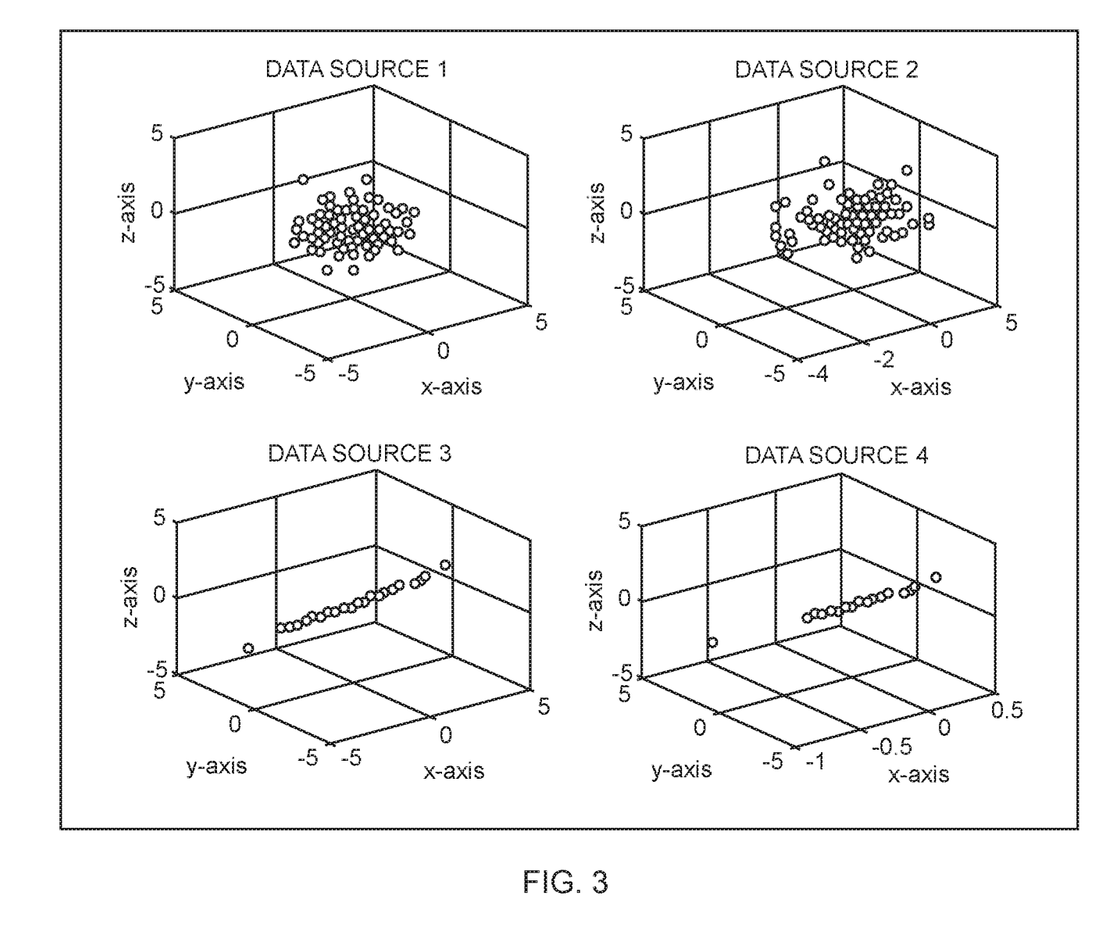
FIG. 3 depicts scatter plots of raw input data for data fusion according to an embodiment of the present invention.

In order to incorporate multiple sensors within the proposed data fusion method, steps (1) and (2) are repeated for each sensor and sensor data type, i.e., if a sensor outputs more than one data type, then steps (1) and (2) are applied to each data type. Then, at step (3), sensor data is reformatted for each sensor type into pre-rotational $\alpha$-trimmed depth regions, or $D_i^\alpha(P)$. FIG. 3 shows individual sensor data formed into pre-rotational $\alpha$-trimmed depth regions.

Having solved for all empirical distributions, $P_{i,n}$ and defined the generate form of the $\alpha$-trimmed depth-region, $D_i^\alpha(P)$, the next step of the fusion process is introduced.

Each realization of $D_i^\alpha(P)$ is two-dimensional, or planar, representation or visualization, that encompasses the Tukey-Half Space Depth. This data should be fused such that the fused data product is capable of providing a singular $\alpha$-trimmed depth region, or volumetric dispersion, for any subsequent post-processing.

The fusion process method is formulated such that the individual two-dimensional $\alpha$-trimmed depth regions are transformed into a new three-dimensional $\alpha$-trimmed depth region, or a $D_i^\alpha(P)\rightarrow D^\alpha(P)$. Mathematically, this is equivalent to the following:

$$D_i^\alpha(P)=\{x\in\mathbb{R}^2|D_i(x; P)\geq\alpha\}\forall i\in[1,\ldots,n] \quad (14)$$

being transformed to (see FIG. 4), $$D^\alpha(P)=\{x\in\mathbb{R}^3|D(x; P)\geq\alpha\}\forall i\in[1,\ldots,m] \quad (15)$$

where m is defined as the number of sensors to be fused.

Essentially, the individual $D_i^\alpha(P)$ is translated into a higher dimensional space where every $D_i^\alpha(P)$ in $\mathbb{R}^2$ is treated as a single operator, or Tukey-Half-Space Depth in $\mathbb{R}^3$, or $D^\alpha(P)$. An affine transformation from a Cartesian coordinate system to the spherical coordinate system is used to transform the heterogeneous $\alpha$-trimmed depth regions to a new three-dimensional $\alpha$-trimmed depth region, $D_i^\alpha(P)\rightarrow D^\alpha(P)$. The use of affine transformation allows for preserving the affine equivariant nature of the collection of $D_i^\alpha(P)$ half-space representations of the source data.

The data fusion process described by equations (14) and (15) is generalizable to any dimension in $\mathbb{R}^d$, where the subscript d denotes the dimension of the fusion operator $D^\alpha(P)$, such that the embodiment of the invention may be applied to any data types, such as: 1-dimensional communications data vectors; 2-dimensinal target track covariance matrices; 3-dimensional datacubes, as used in fire-control radar signal processors for space-time adaptive processing; and any higher-dimensional data sources requiring fusion. An example of transforming 1-dimensional data vectors into a higher-dimensional operator under the embodiment of this invention is described for the case of a communications signal, of length n.

Figure 7:
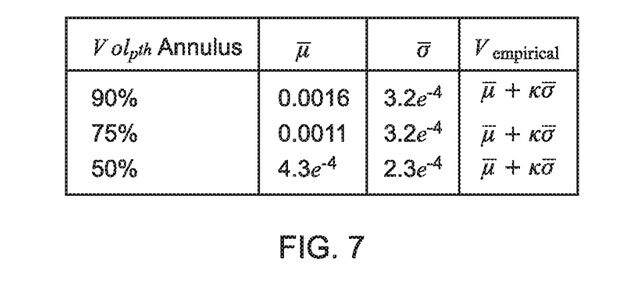
FIG. 7 depicts a table of empirical thresholds according to an embodiment of the present invention.

The fusion process method is formulated such that the individual one-dimensional $\alpha$-trimmed depth regions are transformed into a new two-dimensional $\alpha$-trimmed depth region, or a $D_i^\alpha(P)\rightarrow D^\alpha(P)$. Mathematically, this is equivalent to the following:

$$D_i^\alpha(P)=\{x\in\mathbb{R}^1|D_i(x; P)\geq\alpha\}\forall i\in[1,\ldots,n] \quad (16)$$

being transformed to (see FIG. 7), $$D^\alpha(P)=\{x\in\mathbb{R}^2|D(x; P)\geq\alpha\}\forall i\in[1,\ldots,m] \quad (17)$$

where m is defined as the number of sensors to be fused. Thus, having taken m sensor 1-dimensional vector communication signals of length n, the fusion process transforms the lower-dimensional vectors into a higher-dimensional operator best described as a 2-dimensional plane. Various data visualization and processing algorithms are then able to be applied to the new higher-dimensional fused data operator.

The embodiment of this invention is applicable to all dimensional sizes of data, and the following two examples demonstrate cases wherein the data to be fused is 3-dimensional, such as the case with common data types generated by fire-control radar systems that routinely form 3-dimensional datacubes to represent data across space (Cartesian X and Y-dimensions) and time (Cartesian Z-dimension). The data fusion process is applied to transform multiple datacube courses into a new higher 4-dimensional operator. The fusion process method is formulated such that the individual three-dimensional α-trimmed depth regions are transformed into a new four-dimensional α-trimmed depth region, or a $D_i^\alpha(P) \geq D^\alpha(P)$. Mathematically, this is equivalent to the following:

$$D_i^\alpha(P) = \{x \in \mathbb{R}^3 | D_i(x; P) \geq \alpha\} \forall i \in [1, \ldots, n] \quad (18)$$

being transformed to, $$D^\alpha(P) = \{x \in \mathbb{R}^4 | D(x; P) \geq \alpha\} \forall i \in [1, \ldots, m] \quad (19)$$

where m is defined as the number of sensors to be fused. Thus, having taken m sensor 3-dimensional vector communication signals of length n, the fusion process transforms the lower-dimensional vectors into a higher-dimensional operator best described as a 4-dimensional plane. Visualization of this high-dimensional operator requires stereographic projection in order to project the 4-sphere into 3-dimensional space for analysis. Exploitation of the high-dimensional fused data operator is left to the unique requirements of each end-user.

In the event the data to be fused is initially of different dimension-i.e. a vector and matrix of dimension 1 and 2, respectively, the equations of (14) and (15) are still applicable, but described mathematically as:

$$D_i^\alpha(P) = \{x \in \mathbb{R}^d | D_i(x; P) \geq \alpha\} \forall i \in [1, \ldots, n] \quad (20)$$

Where the subscript d in (18) denotes the dimensionality of the data to be fused. The fused data is then transformed into the higher dimensional data operator and described by the following expression, which also is a generalized form of (15), $$D^\alpha(P) = \{x \in \mathbb{R}^{(1+max(d_m))} | D(x; P) \geq \alpha\} \forall i \in [1, \ldots, m] \quad (21)$$

where the subscript m denotes the number of sensor data to be fused.

Additionally, this approach does not seek to scale or modify the original source data, beyond that of an affine transformation of the individual $D_i^\alpha(P)$ to the new fused higher-dimensional operator $D^\alpha(P)$. The $D_i^\alpha(P)$ are equally distributed within a 2-sphere in 3-dimensional Euclidean space via a rotation matrix transformation using the spherical coordinates for n-Euclidean space, with n=3, where the dimension of rotation has been arbitrarily chosen to be the z-axis. The rotation angle in 3-dimensional Euclidean space is found based upon the dimensionality of the sensor data to be fused, where m represents the number of sensors to be fused.

$$\varphi = \frac{\pi}{m} \quad (22)$$

Thus, an affine transformation of the heterogeneous sensor data from $D_i^\alpha(P) \to D^\alpha(P)$ within the newly defined 2-sphere in 3-dimensional Euclidean space results in the formation of the new fused data operator, $D^\alpha(P)$. Mathematically, this operation is applied following the formation of the pre-rotated α-trimmed depth regions, $D'_i^\alpha(P)$, of step (4), and results in:

$$D^\alpha(P) = [D'_1^\alpha(P); \ldots; D'_m^\alpha(P)] \quad (23)$$

in step (5), where m is the number of sensors to be fused, and $D'_i^\alpha(P)$ is defined as:

$$D'_i^\alpha(P) = D_i^\alpha(P) \times R_z(\varphi_i) \forall i \in [1, \ldots, m] \quad (24)$$

assuming that $D_m^\alpha(P)$ is of the form:

$$D_i^\alpha(P) \in [D_i^\alpha(P_x), D_i^\alpha(P_y), 0] \forall i \in [1, \ldots, m] \quad (25)$$

which is a n×3 matrix and may be mathematically defined as a full or sparse matrix.

Figure 4:
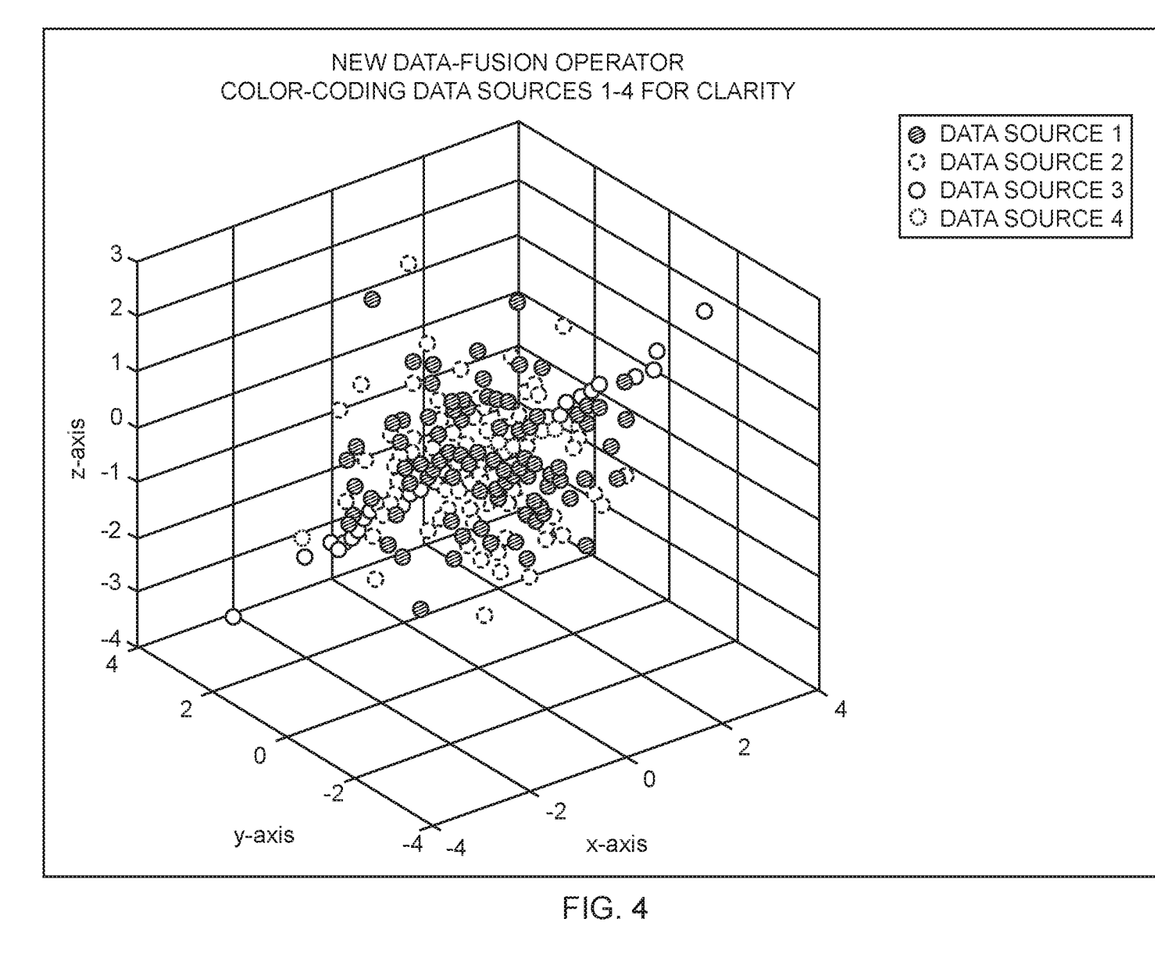
FIG. 4 depicts a data fusion operator that demonstrates affine transformations for sensor types according to an embodiment of the present invention.
Figure 5:
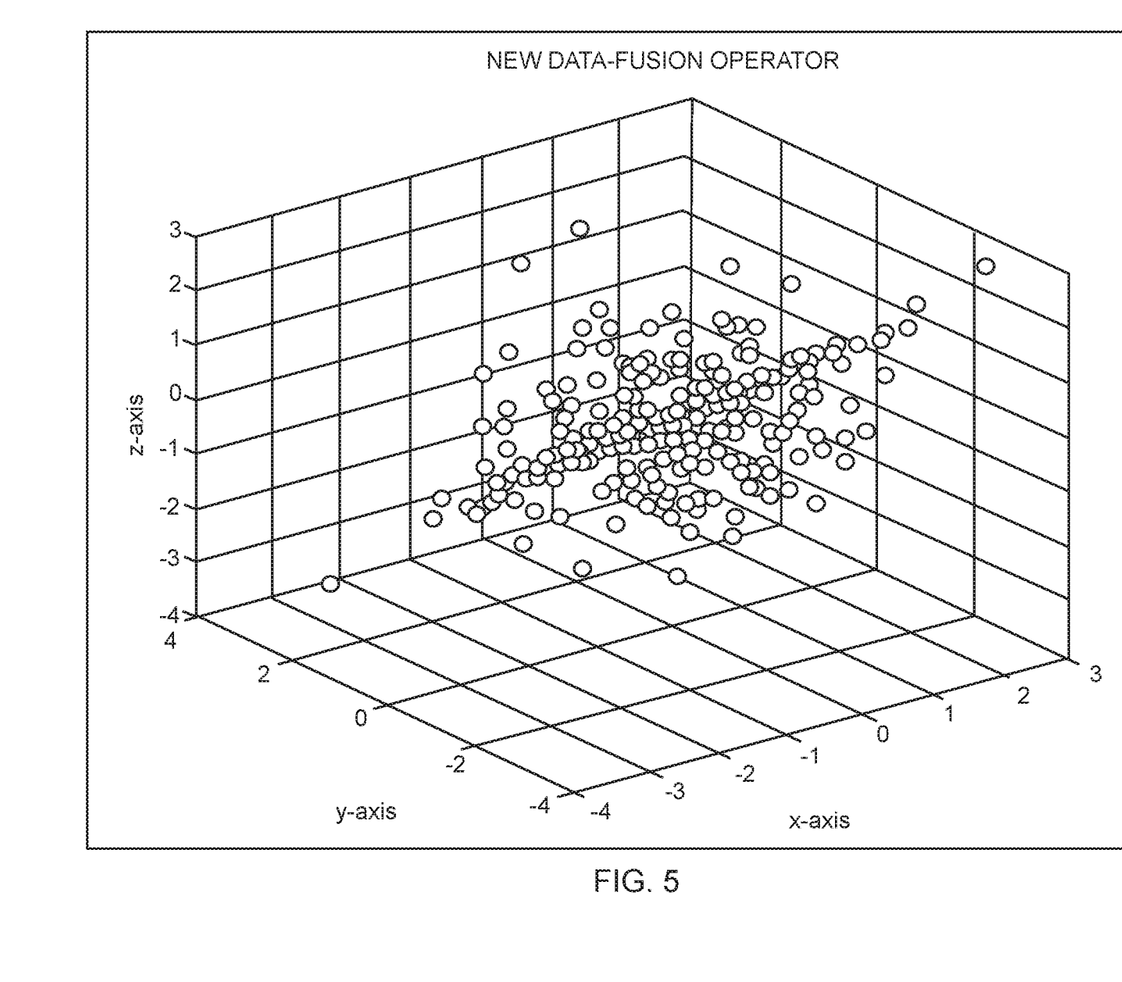
FIG. 5 depicts a data fusion operator according to an embodiment of the present invention.

FIG. 4 shows the post-rotational pre-rotational α-trimmed depth regions, or $D'_i^\alpha(P)$, plotted on a common axis to show the approximate form of the data fusion operator. FIG. 5 shows the actual form of the heterogeneous data fusion operator, $D^\alpha(P)$.

Figure 6:
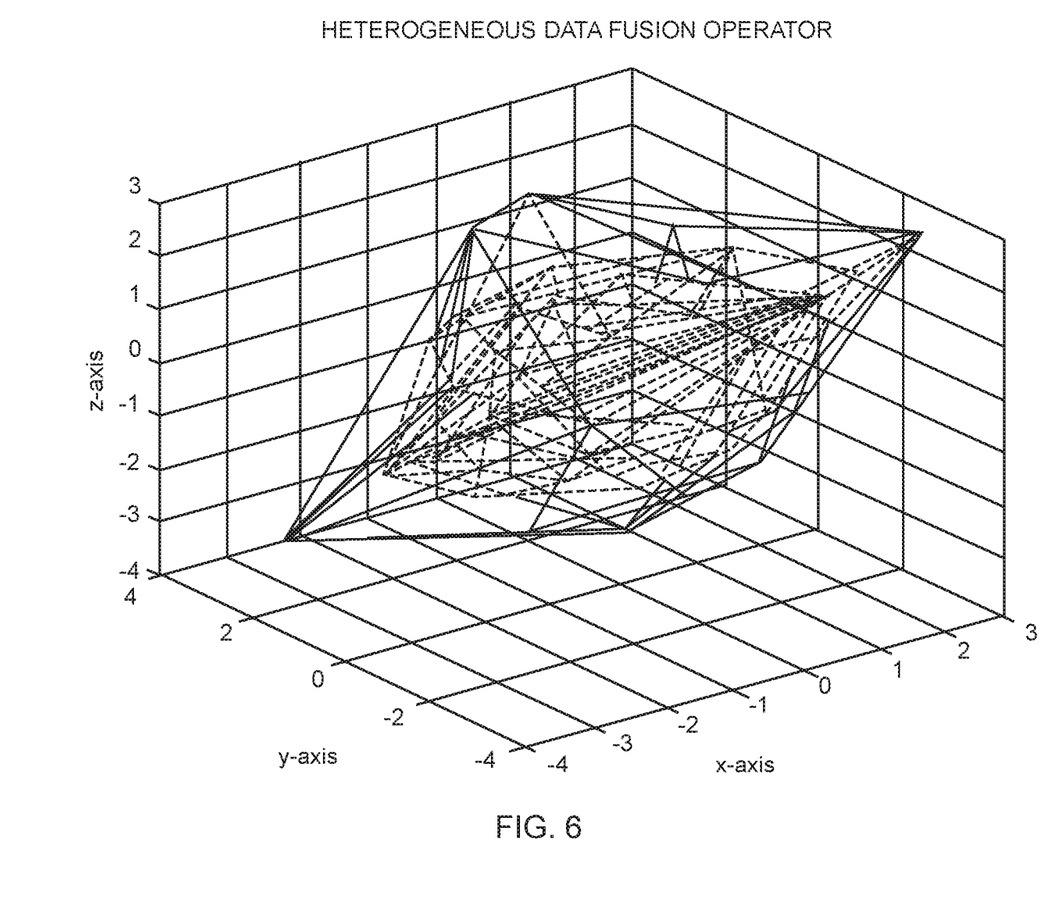
FIG. 6 depicts a post-processing algorithm applied to the data fusion operator according to an embodiment of the present invention.

This new 2-sphere operator, $D^\alpha(P)$, in 3-dimensional Euclidean space is suitable for any variety of post-fusion processing. Since this fusion process is also conducted pre-detection, this method is also referred to as the pre-detection heterogeneous sensor data fusion method. The new data fusion operator $D_i^\alpha(P)$ may be stored, disseminated, and/or post-processed as required in step (6). FIG. 6 is an example of post-processing applied to $D^\alpha(P)$.

Depth-Based Detection

In order to formulate the hypothesis test, the two populations that will be compared should first be defined. The first population considered is that of a general class of arbitrary distribution, representative of the background medium—i.e. noise. The second population is a measured multistatic response matrix including a bounded rank signal perturbation with additive noise, in which the noise is called to simulate a set of signal-to-noise sample values. From these two populations, a new depth-based detection statistic is defined. First, the binary hypothesis test utilized for example is revisited:

$$H_0 := n(t) \text{ and } H_1 := s(t) + n(t) \quad (26)$$

A component of the received signal is measured and compared to a pre-determined, or adaptive, threshold to transform the above equation into:

$$\delta_{threshold} \begin{matrix} < H_0 \\ > H_1 \end{matrix} \quad (27)$$

with the null hypothesis indicating the absence of a signal. The depth-based detection method is also based on a threshold statistic, determined from a ratio of two dispersion values, $$\frac{\hat{V}_{[i]}}{\hat{V}_{[threshold]}} = \delta \quad (28)$$

in which $\hat{V}_{[i]}$ and $\hat{V}_{[threshold]}$ are the differential dispersion values for the populations of the measured multistatic response matrix and noise matrix with arbitrary distribution, respectively. Differential dispersion values are derived from the difference of two dispersion values, as shown below:

$$\hat{V}_{[threshold]} = \hat{V}_{threshold}^\beta - \hat{V}_{threshold}^p \quad (29)$$

The differential dispersion is the difference between the volume defined by the contour β, and that of the volume of a second contour p. The contour β is defined as $\beta \approx 1$, to ensure all of the population values is incorporated in the depth functional. The second dispersion is found from a smaller contour defined by $p \in (0,1)$. As an example, p=[0.5, 0.75, 0.9]. The difference between these two contours defines the volume of an annular region, $\hat{V}_{[threshold]}$, with an increase in the annular region being attributed to the presence of a signal. The differential dispersion of the assumed noise threshold is compared to that of the measured data. In this manner, the second differential dispersion value in the threshold statistic is given as:

$$\hat{V}_{[t]} = \hat{V}_i^\beta - \hat{V}_i^p \quad (30)$$

The depth-based detection binary hypothesis test is now akin to:

$$\delta \underset{>}{\overset{<}{\underset{H_1}{\overset{H_0}{}}}} \delta_{threshold} \quad (31)$$

where the $\delta_{threshold}$ is determined for a given class of measurement noise. As an example, the threshold is found empirically through a Monte Carlo simulation. A large number of noise realizations were created, for population groups of white Gaussian noise including 124 singular values, to determine the empirical volume of the annular region bounded by the contour $D^p$ and $D^\beta$. This Monte Carlo simulation is repeated several times to ensure a consistent estimator for the empirical mean $\mu$ and standard deviation $\sigma$.

For each instance, the empirical volume is calculated for the annulus by subtracting the volume of the p=[0.5, 0.75, 0.9] contours from the $p_{max}=1$ contour. The mean and variance for the volume of the annular region are listed in the table shown in FIG. 7.

Figure 8:
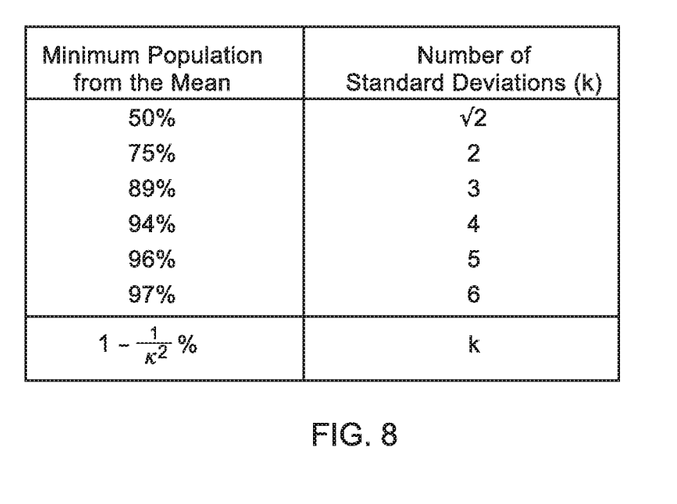
FIG. 8 depicts a table of empirical thresholds according to an embodiment of the present invention.
Figure 9:
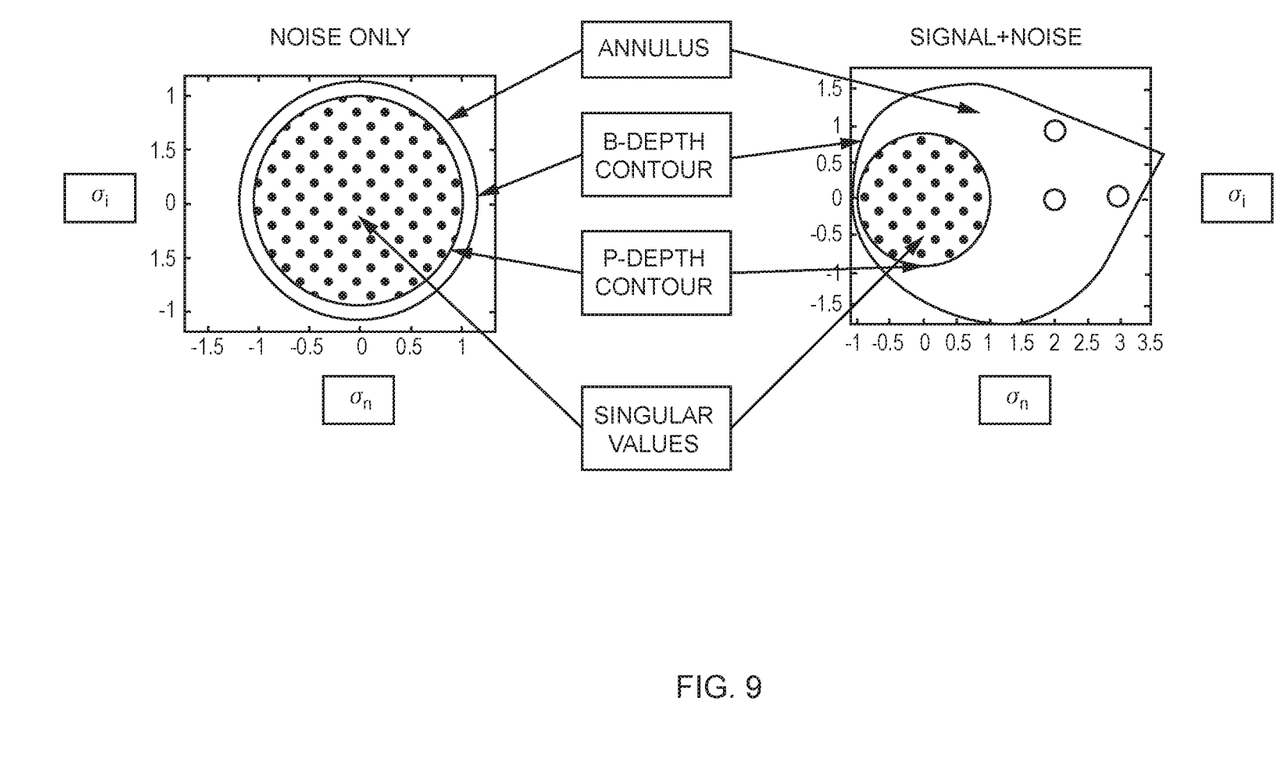
FIG. 9 depicts a data depth functional annular volume comparison for noise only versus signal and noise according to an embodiment of the present invention.

From the table shown in FIG. 8, it is shown that for an empirical false alarm rate of 6%, it is required the $\hat{V}_{threshold}$, $\mu + k\sigma$, to be equivalent to $\mu + 4\sigma$. Likewise, for an empirical false alarm rate of 4% and 3%, it is required the $\hat{V}_{threshold}$ to be $\mu + 5\sigma$ and $\mu + 6\sigma$, respectively. Further, the dispersion resulting from the addition of a signal in the measured noise is manifest from the outlying nature of the signal singular values, when compared to the body of the measured noise plus a priori noise distribution data depth functional, which is true for nominal signal-to-noise ratios (SNR). This is due to the fact that the singular values associated with the signal exhibit a level of eigenvalue repulsion, allowing them to be separate from the body of the data depth functional. This is shown in FIG. 9. This is further manifest from an application of Newton's Third Law to the eigenvalues of the singular value decomposition of the multistatic response matrix. As the SNR decreases, this 'eigenvalue' repulsive force becomes weaker and the signal singular values become distributed on the outer contour of the data depth functional. From this vantage point, the values for which the singular values are most outlying are sought, and result in an increase in volume for a given annular contour bounded by $p^{th} \in (p, 1)$. Since the metric is defined as the ratio of scale curves, and the false alarm rate is controlled by the empirical $\hat{V}_{threshold}$, in this manner the threshold is equivalent to unity, $\delta_{threshold}=1$. The Chebyshev Inequality represents a more severe constraint on the detection statistic, and should be more robust, though may result in lower $P_D$ versus SNR for a given $P_{FA}$.

Thus, introduced herein is a depth-based method for target detection in noisy environments based on a random matrix theoretic pre-detection fusion algorithm to solve for the multistatic response matrix. The depth-based detector is nonparametric in formulation and does not rely on the underlying corruptive noise process to conform to a univariate or bivariate distribution. In fact, the depth-based detector should be more optimal for cases in which the underlying noise process is multivariate and not adequately described by a second-order moment method. Further, while the current depth-based detector is generalized for the underlying corruptive measurement process, it is also generalizable to higher dimensions as well.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A method for detecting targets in a real-world background, the method comprising:
   obtaining data from a plurality of sensor sources on a network;
   sending the data to at least one of a data fusion center or a super-sensor;
   fusing the data received from said plurality of sensor sources, said fusing comprising:
      forming an empirical distribution for each of the sensor sources;
      reformatting the data from each of the sensor sources into pre-rotational alpha-trimmed depth regions;
      applying an affine transformation rotation to each of the reformatted data to form post-rotational pre-rotational alpha-trimmed depth regions;
      reformatting each affine transformation into a new data fusion operator; and
   using said fused data to determine whether a target is present in at least one of: on the ground, in the air, or in outer space, in a real-world background.

2. The method of claim 1, further comprising one or more of storing, post-processing, and disseminating the new data fusion operator.

3. The method of claim 1, wherein the new data fusion operator is three-dimensional.

4. The method of claim 1, further comprising solving for an affine transformation value.

5. The method of claim 1, wherein each of the sensor sources comprises a transceiver.

6. The method of claim 1, wherein the data is sent to a super-sensor, and the method is performed by a super-sensor on the network.

7. The method of claim 1, wherein the sensor sources are either similar or dissimilar.

8. The method of claim 1, wherein the data from the sensor sources is either similar or dissimilar.

9. The method of claim 1, wherein the data comprises one or more of imaging, radiofrequency, electro-optical, infrared, communication, acoustic, pressure, temperature, and gravimetric.

10. A data fusion system for a plurality of sensor sources on a network for detecting targets in at least one of: on the ground, in the air, or in outer space, in a real-world background, the data fusion system comprising:
    a central fusion center configured to receive data from the sensor sources and fuse the received data into a higher-dimensional statistical population, wherein fusing the received data comprises:

forming an empirical distribution for each of the sensor sources;

reformatting the data from each of the sensor sources into pre-rotational alpha-trimmed depth regions;

applying an affine transformation rotation to each of the reformatted data to form post-rotational pre-rotational alpha-trimmed depth regions; and reformatting each affine transformation into a new data fusion operator, wherein said data fusion system is used to detect whether a target is present in at least one of: on the ground, in the air, or in outer space, in a real-world background.

11. The system of claim 10, wherein fusing the received data further comprises one or more of storing, post-processing, and disseminating the new data fusion operator.

12. The system of claim 10, wherein the new data fusion operator is three-dimensional.

13. The system of claim 10, wherein fusing the received data further comprises solving for an affine transformation value.

14. The system of claim 10, wherein each of the sensor sources comprises a transceiver.

15. The system of claim 10, wherein the central fusion center is a super-sensor.

16. The system of claim 10, wherein the sensor sources are either similar or dissimilar.

17. The system of claim 10, wherein the received data is either similar or dissimilar.

18. The system of claim 10, wherein the received data comprises one or more of imaging, radio-frequency, electro-optical, infra-red, communication, acoustic, pressure, temperature, and gravimetric.

19. A non-transitory computer-readable medium having stored thereon a computer program for execution by a processor configured to perform a method of fusing data received from a plurality of sensor sources on a network for detecting whether a target is present in at least one of: on the ground, in the air, or in outer space, in a real-world background, the method comprising:

forming an empirical distribution for each of the sensor sources;

reformatting the data from each of the sensor sources into pre-rotational alpha-trimmed depth regions;

applying an affine transformation rotation to each of the reformatted data to form post-rotational pre-rotational alpha-trimmed depth regions;

reformatting each affine transformation into a new data fusion operator; and using said fused data to determine whether a target is present in at least one of: on the ground, in the air, or in outer space, in a real-world background.

20. The computer-readable medium of claim 19, further comprising one or more of storing, post-processing, and disseminating the new data fusion operator.

21. The method of claim 1, wherein at least some of the data received from the sensor sources and fused is at least one of pre-detection and pre-processed data.

22. The method of claim 1, wherein the fusion center or super-sensor formats and/or stores the data for processing on an at least a near real-time basis.

23. The method of claim 1, wherein at least two of said plurality of sensors comprise radar systems that are separated by a distance, and said radar systems search for targets with a defined radar-cross section.

24. The method of claim 23, wherein the sensors comprise part of a system that can detect, discriminate, declare, and identify targets autonomously.

25. The method of claim 24, wherein said radar comprises part of a fire-control radar system for targeting, tracking, and hitting a target.

* * * * *